United States Patent [19]
Allred et al.

[11] Patent Number: 6,011,584
[45] Date of Patent: Jan. 4, 2000

[54] METHOD AND APPARATUS FOR CORRECTING OFFSETS OF TWO DETECTORS USING RESPECTIVE FUNCTIONS OF A DIFFERENCE

[75] Inventors: Rustin W. Allred, Plano; John B. Allen, Lucas; John L. Snyder, III, Garland; Donald C. Whitney, Plano; Anthony L. Leatham, McKinney, all of Tex.

[73] Assignee: Raytheon Company, Lexington, Mass.

[21] Appl. No.: 08/960,053

[22] Filed: Oct. 29, 1997

Related U.S. Application Data

[60] Provisional application No. 60/032,142, Dec. 9, 1996.

[51] Int. Cl.⁷ .................................................. H04N 5/217
[52] U.S. Cl. ............................................ 348/241; 348/219
[58] Field of Search .................................... 348/241, 251, 348/219; 358/461, 463, 474; 250/208.1

[56] References Cited

U.S. PATENT DOCUMENTS

| | | | |
|---|---|---|---|
| 5,323,334 | 6/1994 | Meyers et al. | 364/571.05 |
| 5,335,091 | 8/1994 | Palum | 358/474 |
| 5,350,911 | 9/1994 | Rafanelli et al. | 250/201.9 |
| 5,514,865 | 5/1996 | O'Neil . | |
| 5,717,208 | 2/1998 | Woolaway, II | 250/332 |
| 5,798,875 | 8/1998 | Fortin et al. | 358/474 |
| 5,838,813 | 11/1998 | Kancler et al. | 250/208.1 |

FOREIGN PATENT DOCUMENTS

| | | |
|---|---|---|
| 0483530A2 | 5/1992 | European Pat. Off. . |
| 0600742A1 | 6/1994 | European Pat. Off. . |
| 2661583 | 10/1991 | France . |
| 2248742 | 8/1992 | United Kingdom . |

OTHER PUBLICATIONS

O'Neil, "Dithered Scan Detector Compensation", Proc. IRIS Passive Sensors, 1992. vol. 1, pp. 123–134.

O'Neil, et al., "Experimental Performance of a Dither-Scanned InSb Array", Proc. IRIS Passive Sensors, 1993, vol. 1., Title Page and pp. 167–176.

O'Neil, "Experimental Verification of Dither Scan Non-uniformity Correction", 1996 IRIS, 11 unnumbered pages.

*Primary Examiner*—Wendy Garber
*Assistant Examiner*—Aung S. Moe
*Attorney, Agent, or Firm*—Baker & Botts, L.L.P.

[57] ABSTRACT

A dithered offset correction method wherein, according to a first embodiment, updates are made of the offset correction during each iteration and, after four iterations, the offset for each pixel or detector element is updated from all of its neighbors to provide faster convergence than is obtainable by the prior art. In accordance with a second embodiment, the offset for each detector element is updated for every iteration and, for each update, the update is made with information from an entire row or an entire column of data. After four iterations, each offset has been updated with information from every detector element in the focal plane array. This provides even more rapid convergence compared to the prior art.

28 Claims, 1 Drawing Sheet

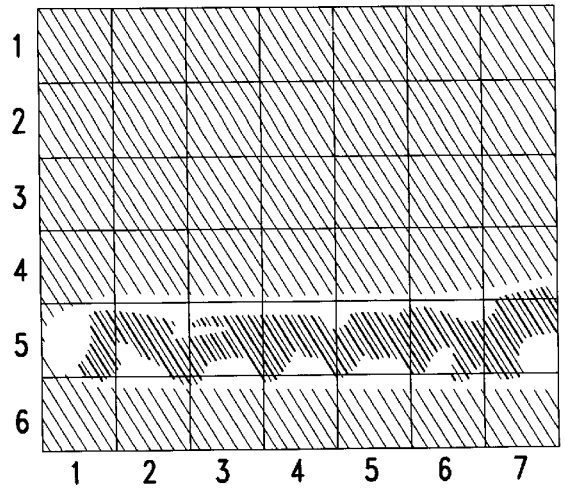
Fig.1a FRAME 1
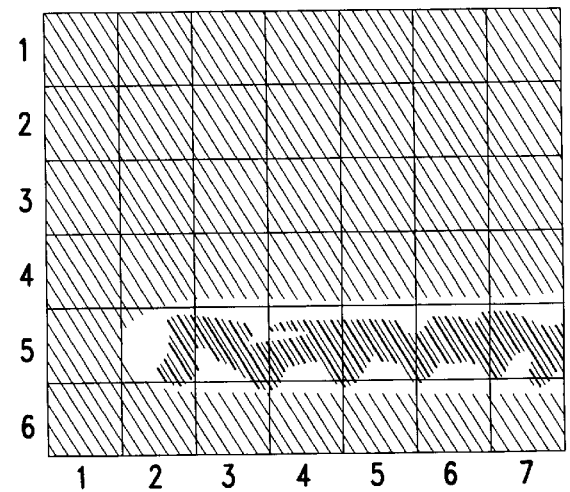
Fig.1b FRAME 2
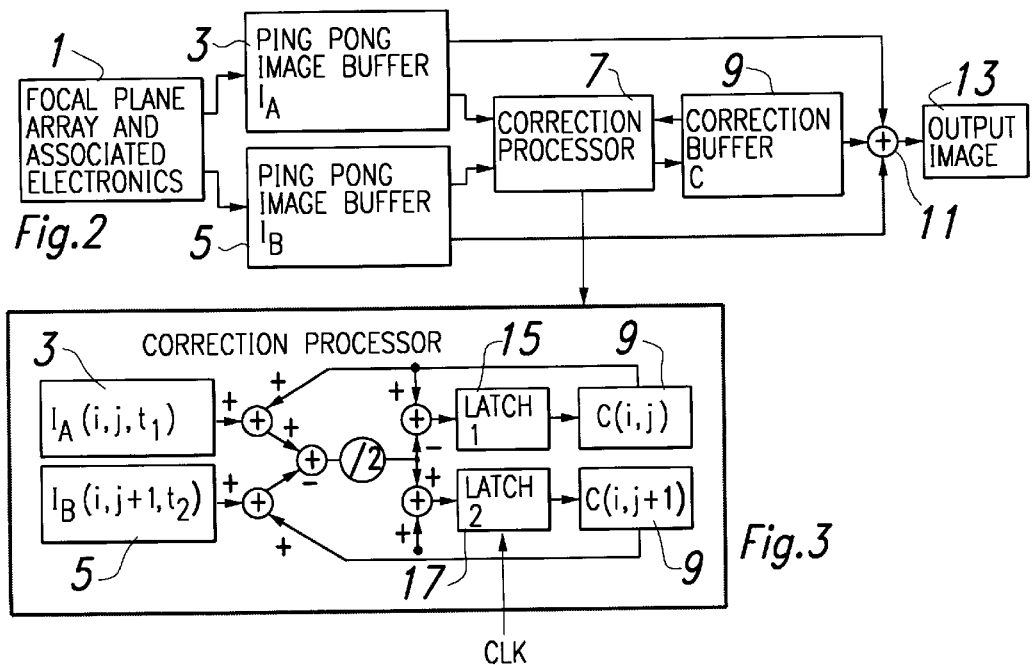
Fig.2
Fig.3

METHOD AND APPARATUS FOR CORRECTING OFFSETS OF TWO DETECTORS USING RESPECTIVE FUNCTIONS OF A DIFFERENCE

CROSS REFERENCE TO RELATED APPLICATIONS

This application claims priority under 35 USC § 119 of provisional application No. 60/032,142 filed Dec. 9, 1996.

BACKGROUND OF THE INVENTION

1. Field of the Invention

This invention relates to offset correction for use in conjunction with detectors and primarily infrared detectors.

2. Brief Description of the Prior Art

Detector systems generally include a plurality of detector elements, generally arranged in a column or a matrix, which scan or stare at a scene and generate a signal from each detector element (generally referred to as a "pixel") indicative of the portion of the scene detected by that detector element at a particular point in time. The full scene is a composite of the signals received from all or a portion of the detectors elements. In order for the full scene to be depicted accurately, it is necessary that each of the detector elements provide an identical output for the same input. This is generally not the case because most detectors have a different response to the same input thereto. This requires that each detector element be calibrated and that its output be adjusted to normalize the system, hence the use of offset correction to calibrate each of the detector elements. This calibration takes place while the detector array is operating in a system and is a part of the circuitry of the system.

Offset correction takes many forms, one such form involving the use of a thermal source and a chopper whereby the thermal source is used as the common scene for all of the detector elements for calibration. Since all of the detector elements are provided with an identical scene, any differences from detector element to detector element can be measured and an offset provided to each detector element to compensate for the differences and normalize the output of the system. A problem with this technique is that the detector system cannot view the scene continually because recalibration is required periodically, at which time the thermal source is substituted for the scene. Furthermore, the use of the thermal source and chopper adds substantial bulk and cost to the system. A yet further problem is that the outputs of one or more of the detector elements can change after initial calibration for various reasons, thereby making the existing factory installed offset inaccurate. In addition, calibration takes place at an artificial flux level rather than at the true scene flux level, so calibration is not necessarily taking place under the same conditions as the actual operation. It is therefore apparent that other types of detector calibration would be desirable.

In this regard, dither offset has been developed. Prior art systems of this type are set forth in a paper entitled "Dithered Scan Detector Compensation" by William F. O'Neil, *Proc. IRIS Passive Sensors*, 1992, Vol. 1, pp. 123–134, the contents of which are incorporated herein by reference. This reference sets forth systems for sensing images using a detector array and correcting errors in the image signals caused by gain and offset variations from detector to detector in the array. To correct gain and offset errors, the detector array is dithered by moving the detector line of sight between consecutive frames according to a predetermined pattern. This dithering causes different detectors to image the same location in the scene during different frames and causes two adjacent detectors to scan between the same two points in the scene during a cycle of the dither pattern. Image data generated from the dithering is used to remove gain and offset errors from the sensed images and to generate gain and offset correction values to be stored in a table and applied to the sensed images. The system continually recalibrates and maintains the correction immune to scene changes when the detector array is installed on a moving platform.

The above described approach of O'Neil updates the offsets every four frames using information only from four neighboring detectors to update the offset correction for a given pixel. This approach provides relatively slow correction for two reasons, these being (1) correction is only updated every four frames and, more important, (2) only a small amount of the available information is used in computing the correction.

SUMMARY OF THE INVENTION

In accordance with the present invention, there is provided a dithered offset correction system which improves the offset correction relative to O'Neil. The system assumes that the gain of each detector element will not vary excessively from its originally determined state with time and that any small variation will be essentially compensated for by the offset provided in accordance with the present invention. In accordance with one form of the present invention, the offset correction for each pixel is updated every frame and, after a predetermined number of frames, has been updated with information from all of the neighboring pixels and, indirectly, from all of the neighbors of the neighboring pixels, ultimately including all of the pixels. This provides much faster convergence than is available by the techniques described by O'Neil. In accordance with a second form of the present invention, the offset correction for each pixel is updated every frame and uses, for each update, information from an entire row or an entire column of data. After a predetermined number of iterations, each offset has been updated with information from every detector in the focal plane array. This provides for extremely rapid convergence compared to the prior art. It should be noted that it is possible to construct other dithered offset correction variants that exchange convergence speed and implementation cost. This is accomplished by limiting the number of detectors actually used in each dithered offset correction iteration.

Briefly, the above is accomplished in accordance with a first embodiment of the invention by measuring the flux from a scene with each detector element $S_n$ of a detector array at a first point in time $t_1$ and then dithering or shifting each detector element relative to the scene so that another detector element $S_{n+1}$ in the array now sees the same scene during a later second iteration as was seen during the first iteration, this dithering or shifting taking place for all of the detector elements in the detector array. Accordingly, each detector element is moved in the same direction along the x-axis (left or right) or in the same direction along the y-axis (up or down) or according to some other pattern at a second point in time $t_2$. Ignoring temporal noise and gain variations, the differences between the outputs of detector elements $S_n$ and $S_{n+1}$ under equal flux conditions will be due to an offset difference. Using the output differences between the two adjacent detector elements $S_n$ and $S_{n+1}$, an offset correction $O_n$ is formed for each detector element. This correction will preferably be one half the difference between the two detector elements (though other portions of the difference or functions of the difference are contemplated herein) and the one half of the difference is subtracted from the larger detector output value and added to the smaller detector output value. The same procedure is followed concurrently for detector elements $S_{n+1}$ and $S_{n+2}$ ... in all directions until a complete loop is made and the sequence starts over. At this time, every detector element $S_n$ will thereby be corrected twice for each iteration, once by the function of the difference between the detector element output viewing the same scene portion on the prior iteration $S_{n-1}$ and once by the function of the difference between the detector element now viewing the portion of the scene viewed by detector element $S_n$ during the prior iteration. The correction takes the form:

$$O_n=[S_n(t_n)-S_{n+1}(t_{n+1})]/2+[S_{n-1}(t_n)-S_n(t_{n+1})]/2.$$

Each detector element output can be thought of as a flux dependent term plus a constant offset which varies, or $S_n=F(\emptyset)+b_n$. With the above stated assumptions, all scene dependence cancels, leaving $O_n=-[(b_n-b_{n+1})]/2+[(b_{n-1}+b_{n+1})]/2$. Considering the offset array to be the offsets on each detector element, the partial correction row contains the partial corrections derived from adjacent detector elements. The correction row is the sum of the corresponding partial corrections. The corrected row is the initial offset added to the correction. The second and further iterations are effected in the same fashion, starting with the corrected values.

In accordance with a second embodiment of the invention, the above described procedure is utilized except that each correction is provided with the full comprehension of the previous corrections. Whereas in the above described embodiment, partial corrections are computed based solely upon the initial offset values, in this embodiment, $S_n$ is corrected by the difference between $S_n$ and $S_{n+1}$ before the difference between $S_n$ and $S_{n+1}$ is provided. This changes the above equations to read:

$$O_n=[S_n(t_n)-S_{n+1}(t_{n+1})]/2+[S_{n-1}(t_n)+O_{i-1}S_n(t_{n+1})]/2.$$

The term $O_n$ has become recursive and the offsets now become smoothed according to the equation:

$$O_i = -\frac{2^i b_i + \sum_{n=0}^{i-1} 2^n b_{n+2} + b_1}{2^i}$$

As is apparent from the preceding equation, each new correction is based upon offsets of all prior corrections. This accounts for the rapid convergence.

Both of the above described procedures can be performed on two dimensional arrays by dithering in a one-detector sized square. By doing so, correction takes place from, for example, left to right, from top to bottom, from right to left and then from bottom to top. The offsets converge to the mean offset of the array, even in the presence of white temporal noise.

BRIEF DESCRIPTION OF THE DRAWINGS

FIGS. 1a and 1b are schematic diagrams of frames detected by a detector array before and after dithering respectively;

FIG. 2 is a block diagram of circuitry for providing an output for each detector element of the array in accordance with the present invention; and FIG. 3 is a schematic diagram of the operation of the correction processor of FIG. 2.

DESCRIPTION OF THE PREFERRED EMBODIMENTS

Referring first to FIGS. 1a and 1b, there is shown a simulation of a scene which has arbitrarily been broken down into forty-two (6×7) sections or pixels arranged in a matrix. The numbers in each section correspond to row and then column in the matrix. A bank of detector elements corresponds to the matrix, there being one detector element for each matrix section. Referring to each pixel of the matrix by row number and then column number (i.e., $D_{rc}$ is the detector at row r and column c), during a first iteration, each detector element or pixel $D_{rc}$ will detect a Portion of a scene and provide an output for each pixel. It can be seen in FIG. 1a that detector elements $D_{51}$ to $D_{57}$ have detected an infrared scene and the other pixels have detected no infrared radiations. During a second iteration, the scene has moved in the matrix along row 5 so that the pixels $D_{52}$ to $D_{57}$ now view what was previously seen by pixels $D_{51}$ to $D_{56}$ respectively and the scene previously viewed by pixel $D_{57}$ is out of view of the detector array. It follows that any difference in output from pixels viewing the same scene portion from the first to the second iteration is an offset which is to be corrected. This correction is made by adding half of the offset to the pixel with the lower output and subtracting half of the offset from the pixel with the higher output. It can be seen that all of the pixels in the row are corrected based upon comparison with pixels on both sides thereof.

The above described procedure is repeated during a third iteration by moving the scene upward so that it fills pixels $D_{42}$ to $D_{47}$, and is repeated during a fourth iteration by moving the scene sideways so that it fills pixels $D_{41}$ to $D_{47}$ and is repeated during a fifth iteration so that the scene returns to its position in FIG. 1a.

Referring to FIG. 2, there is shown a block diagram of circuitry for providing an output for each detector element of the array in accordance with the present invention. There is shown a standard focal plane array with standard associated electronics 1 for detection of a scene in standard manner. Images or scenes detected by the detectors of the focal plane array 1 are stored in the current ping pong image buffers 3 and 5. The correction buffer 9 adds the correction to the raw scene in adder 11 of the matrix of outputs of the matrix of detectors in the focal plane array and provides an output image 13 indicative of the new offset.

Referring to FIG. 3, there is shown a schematic diagram of the operation of the correction processor 7. This diagram assumes mechanical dither motion in the j direction. For embodiment 1, a slow clock is used and the offset correction buffer 9 is updated only on a per-frame basis with the updates calculated based upon the buffer 9 contents from the prior frame. For embodiment 2, however, a fast clock is used to update the correction buffer 9 as the updates are computed. In this way, the most current corrections are used for all calculations. In both cases, correction covers every row (or column) in its entirety between new data frames.

The above described techniques can be implemented in hardware or software. A hardware implementation is shown. For either embodiment, the overall architecture is the same with only clock rates in the correction processors differing. For the present discussion, it is assumed that induced motion is exactly one pixel from left to right and the index "j" increments to the right. Typically, a one-pixel square pattern is used and motion goes left, down, right, up, but other configurations are possible.

The general architecture operates as follows: An image is received from the focal plane array and associated electronics (FPA). One image is stored into ping pong image buffer $I_A$ 3. The next image, in which the scene has been offset or dithered, is stored in buffer $I_B$ 5. At any instant in time, the output image is formed by adding the most current image to the most current offset correction from correction buffer 9. The images from both image buffers 3 and 5 are received into the correction processor 7 for correction updates. The correction update is effected for the entire array before the new scene arrives from the FPA. The new scene, dithered with respect to the previous scene, is now received back in ping pong buffer $I_A$ 3 and the process continues.

For either embodiment, the correction for every row (or column, depending upon the direction of dither) is independent of the other rows (or columns), allowing all rows or columns to be corrected simultaneously. In the first embodiment, no corrections are made on a pixel until corrections have been calculated for the entire row. In the second embodiment, however, the pixel corrections are made "on the fly", allowing the corrections to always be made with the most up-to-date information on every pixel.

In accordance with the first embodiment with reference also to FIG. 3, pixels are read from the image buffers 3,5 and are corrected using the correction factors from the correction buffer 9. The difference between these pixels is computed and divided by two to form a correction update. This correction update is then subtracted from the correction factor corresponding to the left-hand pixel and added to the correction factor corresponding to the right hand pixel. These new values are then stored in latches 15 and 17. Index "j" then increments and the entire process repeats. After the entire row has been corrected, a clock strobes the latches 15,17 and the newly formed correction factors are used to update the correction buffer 9.

In accordance with the second embodiment, the process is identical to that of the first embodiment except for the clock speed. In this case, a high speed clock updates the correction factors on the current pixel pair before incrementing index "j". As a result, when the difference between pixel i,j and pixel i,j+1 is formed, it is formed with a comprehension of the correction already made on pixel i,j. The correction on pixel i,j, likewise, was made with comprehension of the correction previously made on pixel i,j−1, and so forth. Since this process continues across an entire row (or down a column), the last pixel in the row is updated with some information from all the prior pixels in the row. This propagation of information is what accounts for the fast convergence. By contrast, embodiment 1 does no update any of the pixels until updates for the entire row are formed. Hence, though easier to implement, embodiment 1 converges more slowly than does embodiment 2.

In summary, both of the above described embodiments compute an offset correction matrix which is located in the correction buffer 9, this matrix being applied to the scene. When the difference between neighboring pixels if formed, it is formed with comprehension of the current offset values. In other words $S_n = I_n + C_n$, where $I_n$ is the raw detector value (which, in turn, includes scene and offsets, b) . When the difference between neighboring detectors is formed, the difference continually decreases as the as the data stored in the correction buffer matrix 9 becomes a continually better compensation for the original offset differences. The only difference between the two embodiments is that, in embodiment 1, the correction buffer matrix 9 is not updated until the correction across the entire row has been computed. In embodiment 2, the correction buffer matrix 9 is continually updated. For example, the correction between two pixels, such as $S_n - S_{n+1}$, is calculated, however this is actually $I_n + C_n - (I_n + C_{n+1})$. For embodiment 1, $C_n$ has not been updated since the prior frame. For embodiment 2, $C_n$ would already have been partially updated by the prior correction (from the difference $S_{n-1} - S_n$). As an example, if there is a 1×3 array with original offsets B=[2,5,7] and a correction matrix in correction buffer 9 with the values [1,0,−1] with the scene being ignored since it falls out in the calculations, it can be shown that the correction in embodiment 1 is a difference of one-half between one pair and one between the other pair of corrected values (for a difference of 1.5 between ends). For embodiment 2, it can be shown that only a difference of one between one pair and a difference of one between ends exists. Embodiment 2 provides a faster correction than embodiment 1. Information from the first element arrives at the third element by way of the first partial correction on the second element.

Though the invention has been described with reference to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A dithered offset correction method comprising the steps of:
   (a) providing an array of detectors;
   (b) viewing a scene with said detectors at a first time and providing an output from each of said detectors relating to a portion of said scene;
   (c) viewing said scene with said detectors at a second time after said first time with each said portion of said scene detected by one of the detectors of said array other than the detector viewing said portion of said scene at said first time and providing an output from each of said detectors relating to the portion of the scene detected;
   (d) determining a difference in outputs of first and second said detectors viewing the same portion of said scene respectively at said first time and said second time and offsetting one of the first and second detectors having a higher output with a first function of said difference and offsetting the other of the first and second detectors having a lower output with a second function of said difference different from said first function.

2. The method of claim 1 wherein said first function is subtractive and said second function is additive.

3. The method of claim 2 wherein said array of detectors comprises detectors disposed in a matrix arrangement of rows and columns and wherein each portion of said scene is detected at said second time by one of the detectors of said array disposed in one of the same row and the same column as the detector detecting said portion of said scene at said first time.

4. The method of claim 1 wherein said array of detectors comprises detectors disposed in a matrix arrangement of rows and columns and wherein each portion of said scene is detected at said second time by one of the detectors of said array disposed in one of the same row and the same column as the detector detecting said portion of said scene at said first time.

5. The method of claim 1 wherein said first function is subtraction of half of said difference and said second function is addition of half of said difference.

6. The method of claim 5 wherein said array of detectors comprises detectors disposed in a matrix arrangement of rows and columns and wherein each portion of said scene is detected at said second time by one of the detectors of said array disposed in one of the same row and the same column as the detector detecting said portion of said scene at said first time.

7. The method of claim 1 further including the steps of:
viewing said scene with said detectors at a third time after said first and second times with each said portion of said scene detected by one of the detectors of said array other than the detector viewing said portion of said scene at said first and second times and providing an output from each of said detectors relating to the portion of the scene detected;
determining a further difference in outputs of the second detector and a third detector viewing the same portion of said scene respectively at said second and third times and offsetting one of said second and third detectors having a higher output with a third function of said further difference and offsetting the other of the second and third detectors having a lower output with a fourth function of said further difference different from said third function.

8. The method of claim 7 wherein the detectors of said array are disposed in a matrix arrangement of rows and columns and wherein said first detector of said array is disposed in one of the same row and the same column as said second detector and said third detector of said array is disposed in the other of the same row and the same column as said second detector.

9. The method of claim 8 wherein said first function and said third function are each subtractive and said second function and said fourth function are each additive.

10. The method of claim 8 wherein said first function is subtraction of half of said difference between said first and second detectors, said second function is addition of half of said difference between said first and second detectors, said third function is substraction of half of said difference between said second and third detectors, and said fourth function is addition of half of said difference between said second and third detectors.

11. The method of claim 7 wherein said first function and said third function are each subtractive and said second function and said fourth function are each additive.

12. The method of claim 7 wherein said first function is subtraction of half of said difference between said first and second detectors, said second function is addition of half of said difference between said first and second detectors, said third function is subtraction of half of said difference between said second and third detectors, and said fourth function is addition of half of said difference between said second and third detectors.

13. The method of claim 1 further including the steps of:
viewing said scene with said detectors at a third time after said first and second times with each said portion of said scene detected by the same detector of said array as at said first time and providing an output from each of said detectors relating to the portion of the scene detected;
determining a further difference in outputs of said second and first detectors viewing the same portion of said scene respectively at said second and third times and offsetting one of said second and first detectors having a higher output with a third function of said further difference and offsetting the other of said second and first detectors having a lower output with a fourth function of said further difference different from said third function.

14. The method of claim 13 wherein the detectors of said array are disposed in a matrix arrangement of rows and columns and wherein said first detector of said array is disposed in one of the same row and the same column as said second detector.

15. The method of claim 14 wherein said first function is subtraction of half of said difference between said first and second detectors, said second function is addition of half of said difference between said first and second detectors, said third function is subtraction of half of said difference between said second and third detectors, and said fourth function is addition of half of said difference between said second and third detectors.

16. The method of claim 14 wherein said first function and said third function are each subtractive and said second function and said fourth function are each additive.

17. The method of claim 13 wherein said first function and said third function are each subtractive and said second function and said fourth function are each additive.

18. The method of claim 13 wherein said first function is subtraction of half of said difference between said first and second detectors, said second function is addition of half of said difference between said first and second detectors, said third function is subtraction of half of said difference between said second and third detectors, and said fourth function is addition of half of said difference between said second and third detectors.

19. A dithered offset correction system comprising:
(a) an array of detectors for viewing a scene with said detectors at a first time and providing an output from each of said detectors relating to a portion of said scene and viewing said scene with said detectors at a second time after said first time with each said portion of said scene detected by one of the detectors of said array other than the detector viewing said portion of said scene at first time and providing an output from each of said detectors relating to the portion of the scene detected;
(b) circuitry for determining a difference in outputs of first and second said detectors viewing the same portion of said scene respectively at said first time and said second time and offsetting one of the first and second detectors having a higher output with a first function of said difference and offsetting the other of the first and second detectors having a lower output with a second function of said difference different from said first function.

20. The system of claim 19 wherein said first function is subtractive and said second function is additive.

21. The system of claim 19 wherein said first function is subtraction of half of said difference and said second function is addition of half of said difference.

22. A dithered offset correction method, comprising the steps of:
viewing a scene at a first time with a detector array which includes first, second and third detectors, wherein the scene includes first, second, third and fourth portions which are different, and wherein said first, second and third detectors respectively detect the first, second and third portions of the scene at said first time, and respectively provide first, second and third outputs respectively relating to the first, second and third portions of the scene at said first time;
viewing the scene with said detector array at a second time after said first time, wherein said first, second and third detectors respectively detect the second, third and fourth portions of the scene at said second time, and respectively provide fourth, fifth and sixth outputs respectively relating to the second, third and fourth portions of the scene at said second time;
determining a difference between said second and fourth outputs; and adjusting an offset of said first detector by using said difference according to a respective one of first and second functions when said fourth output is respectively larger and smaller than said second output, and adjusting an offset of said second detector by using said difference according to a respective one of said first and second functions when said fourth output is respectively smaller and larger than said second output, said first function being different from said second function.

23. The method according to claim 22, wherein said difference between said second and fourth outputs is a first difference, and including the further steps of:

determining a value which is said fifth output adjusted by using said first difference according to a respective one of said first and second functions when said fourth output is respectively smaller and larger than said second output;

determining a second difference between said third output and said value; and thereafter further adjusting the adjusted offset of said second detector by using said second difference according to a respective one of said first and second functions when said value is respectively larger and smaller than said third output, and adjusting an offset of said third detector by using said second difference according to a respective one of said first and second functions when said value is respectively smaller and larger than said third output.

24. The method according to claim 23, wherein said first function is subtractive and said second function is additive.

25. The method according to claim 23, wherein said first function is subtraction of half of the respective difference used therewith, and said second function is addition of half of the respective difference used therewith.

26. The method according to claim 22, wherein said difference between said second and fourth outputs is a first difference, and including the further steps of:

determining a second difference between said third output and said fifth output; and thereafter further adjusting the adjusted offset of said second detector by using said second difference according to a respective one of said first and second functions when said fifth output is respectively larger and smaller than said third output, and adjusting an offset of said third detector by using said second difference according to a respective one of said first and second functions when said fifth output is respectively smaller and larger than said third output.

27. The method according to claim 26, wherein said first function is subtractive and said second function is additive.

28. The method according to claim 27, wherein said first function is subtraction of half of the respective difference used therewith, and said second function is addition of half of the respective difference used therewith.

* * * * *